United States Patent
Landis et al.

(10) Patent No.: US 11,943,049 B2
(45) Date of Patent: Mar. 26, 2024

(54) METHODS AND APPARATUS FOR NON-COHERENT WAVEFORM TRANSMISSION

(71) Applicant: QUALCOMM Incorporated, San Diego, CA (US)

(72) Inventors: Shay Landis, Hod Hasharon (IL); Assaf Touboul, Netanya (IL)

(73) Assignee: QUALCOMM Incorporated, San Diego, CA (US)

(*) Notice: Subject to any disclaimer, the term of this patent is extended or adjusted under 35 U.S.C. 154(b) by 282 days.

(21) Appl. No.: 17/176,881

(22) Filed: Feb. 16, 2021

(65) Prior Publication Data

US 2021/0258097 A1 Aug. 19, 2021

Related U.S. Application Data

(60) Provisional application No. 62/978,109, filed on Feb. 18, 2020.

(51) Int. Cl.
| | |
|---|---|
| *H04L 1/00* | (2006.01) |
| *H04L 25/02* | (2006.01) |
| *H04W 24/08* | (2009.01) |
| *H04W 74/08* | (2009.01) |
| *H04W 74/0833* | (2024.01) |
| *H04W 76/28* | (2018.01) |

(52) U.S. Cl.
CPC .......... *H04L 1/005* (2013.01); *H04L 25/0204* (2013.01); *H04W 24/08* (2013.01); *H04W 74/0833* (2013.01); *H04W 76/28* (2018.02)

(58) Field of Classification Search
CPC .... H04L 1/005; H04L 25/0204; H04W 24/08; H04W 74/0833; H04W 76/28
See application file for complete search history.

(56) References Cited

U.S. PATENT DOCUMENTS

| | | | | |
|---|---|---|---|---|
| 11,516,736 | B2* | 11/2022 | Beale | H04W 76/28 |
| 2016/0302180 | A1* | 10/2016 | Nory | H04L 27/2607 |
| 2016/0373901 | A1* | 12/2016 | Urabayashi | H04W 48/12 |
| 2018/0103431 | A1* | 4/2018 | Suh | H04B 1/707 |

* cited by examiner

*Primary Examiner* — Ricky Q Ngo
*Assistant Examiner* — Stephen N Steiner
(74) *Attorney, Agent, or Firm* — Arun Swain

(57) ABSTRACT

Aspects of the present disclosure include methods, apparatuses, and computer readable media for monitoring a non-coherent downlink waveform during a discontinuous reception phase, receiving downlink data on the non-coherent downlink waveform, and decoding the downlink data without channel state information of the non-coherent downlink waveform.

25 Claims, 7 Drawing Sheets

METHODS AND APPARATUS FOR NON-COHERENT WAVEFORM TRANSMISSION

CROSS REFERENCE TO RELATED APPLICATIONS

The current application claims priority to and the benefit of U.S. Provisional Application No. 62/978,109 filed Feb. 18, 2020, entitled "Methods and Apparatus for Non-Coherent Waveform Transmission," the contents of which are incorporated by reference in their entireties.

BACKGROUND

Aspects of the present disclosure relate generally to wireless communications, and more particularly, to apparatus and methods for transmitting a downlink (DL) transmission from a base station (BS) to a user equipment (UE) and/or receiving an uplink (UL) transmission at the BS from the UE using a non-coherent waveform.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

When the BS and the UE are in an active communication session (e.g., user of UE is participating in a video conferencing, playing an online game, or streaming a video, etc.), the UE may continuously or frequently monitor the downlink resource for data transmission from the BS. However, when the UE is not in an active communication session, continuous monitoring the downlink resource may unnecessarily consume the electrical energy in the battery of the UE. On the other hand, failure to monitor the downlink resource may prevent the BS from timely communicating with the UE. Therefore, an improvement in downlink resource monitoring may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for monitoring a non-coherent downlink waveform during a discontinuous reception phase, receiving downlink data on the non-coherent downlink waveform, and decoding the downlink data without channel state information of the non-coherent downlink waveform.

Other aspects of the present disclosure include a UE having a memory, a transceiver, and one or more processors operatively coupled with the memory and the transceiver, the one or more processors configured to monitor a non-coherent downlink waveform during a discontinuous reception phase, receive downlink data on the non-coherent downlink waveform, and decode the downlink data without channel state information of the non-coherent downlink waveform.

An aspect of the present disclosure includes a UE including means for monitoring a non-coherent downlink waveform during a discontinuous reception phase, means for receiving downlink data on the non-coherent downlink waveform, and means for decoding the downlink data without channel state information of the non-coherent downlink waveform.

Some aspects of the present disclosure include non-transitory computer readable media having instructions stored therein that, when executed by one or more processors of a UE, cause the one or more processors to monitor a non-coherent downlink waveform during a discontinuous reception phase, receive downlink data on the non-coherent downlink waveform, and decode the downlink data without channel state information of the non-coherent downlink waveform.

Aspects of the present disclosure include methods for transmitting downlink data on a non-coherent downlink channel, performing a channel estimation process to allow a decoding of a coherent downlink waveform, and transmitting additional downlink control/data signals in one or more coherent channels.

Other aspects of the present disclosure include a BS having a memory, a transceiver, and one or more processors operatively coupled with the memory and the transceiver, the one or more processors configured to transmit downlink data on a non-coherent downlink channel, perform a channel estimation process to allow a decoding of a coherent downlink waveform, and transmit additional downlink control/data signals in one or more coherent channels.

An aspect of the present disclosure includes a BS including means for transmitting downlink data on a non-coherent downlink channel, means for performing a channel estimation process to allow a decoding of a coherent downlink waveform, and means for transmitting additional downlink control/data signals in one or more coherent channels.

Some aspects of the present disclosure include non-transitory computer readable media having instructions stored therein that, when executed by one or more processors of a BS, cause the one or more processors to transmit downlink data on a non-coherent downlink channel, perform a channel estimation process to allow a decoding of a coherent downlink waveform, and transmit additional downlink control/data signals in one or more coherent channels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
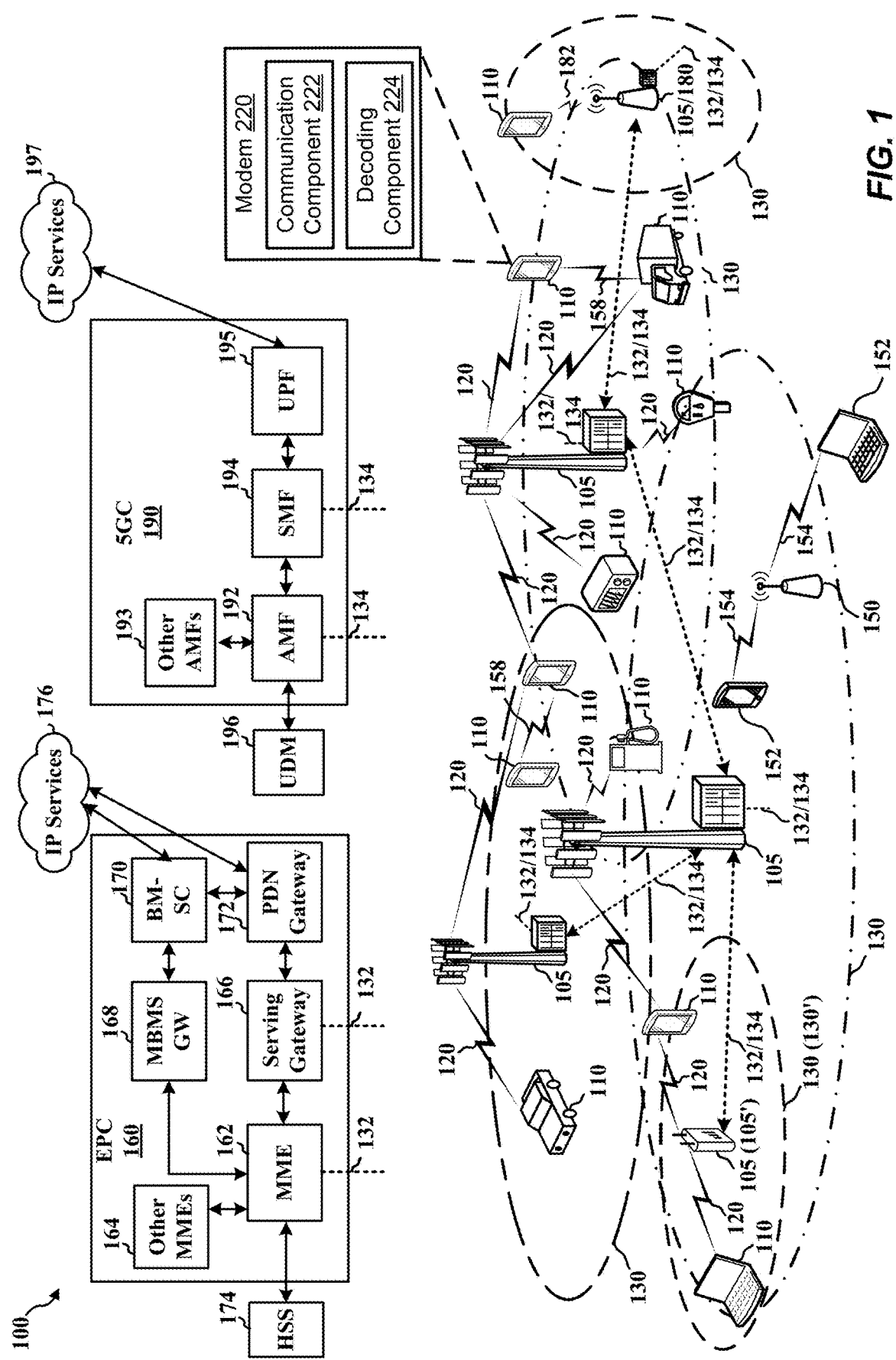
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In an implementation, during a connected mode of communication with a BS, a UE of a network may transition from an active communication phase to a discontinuous reception (DRX) phase, which may include a connected mode DRX or CDRX. In the active communication phase, the UE may be participating in a video conferencing, playing an online game, or streaming a video, etc. As a result, the UE may continuously or frequently monitor the downlink resource for data transmission from the BS. After an end of the active communication phase (e.g., end of video conferencing, finish downloading video, etc.), but while a connection is still maintained (e.g., in connected mode), the UE may transition to the DRX phase. In the DRX phase, the UE may sporadically but routinely or periodically monitor the downlink resource for data transmission. The UE and the BS may synchronize to an agreed time and/or period to monitor the downlink resource. The UE may transition to the DRX phase to conserve electrical energy.

During the DRX phase, the communication channels between the UE and the BS may experience increasing frequency errors. Once the frequency errors increase above a threshold, the transmissions exchanged (DL or UL) between the UE and the BS may become non-coherent and hence the communication channel may be referred to as a non-coherent channel or the communications may be referred to as non-coherent communications or non-coherent waveforms. For example, when the BS transmits DL data over the non-coherent channel, the UE may attempt to decode the DL data before the communication channel restores back to a coherent state. In some instances, the UE may be able to decode all the DL data before the communication channel restores back to being a coherent channel. As a result, the UE may be able to transition to the DRX phase to conserve electrical energy.

In some aspects, receiving data over a non-coherent channel may reduce latency since data may be received during a transition period from non-coherent to coherent waveforms, e.g. from a non-coherent PDCCH to a coherent PDSCH. In other aspects, the UE may use less power since "on" time of the connected mode DRX phase will be shortened. Further, for example for small amounts of data (e.g., such as data that can fit into a slot duration or less), the BS may transmit physical downlink control channel (PDCCH) control signaling and physical downlink shared channel (PDSCH) data non-coherently and quickly go back to sleep without needing to fully converge frequency tracking loops/time tracking loops (FTL/TTL), e.g., to establish a coherent communication.

In certain implementations, non-coherent PDCCH may be used during an "on" duration of the CDRX to allow for lower power and more relaxed FTL/TTL. For instance, when the UE is allocated DL data, the BS may use non-coherent PDSCH to transmit the data since tracking loops have not yet fully converged. Similarly, UL signals can also use non-coherent waveforms during the transition phase from a non-coherent communication channel to a coherent communication channel (e.g., a non-coherent physical uplink shared channel (PUSCH), physical uplink control channel (PUCCH), and/or random access channel (RACH)). In the case of small amounts of data, the UE does not need to transition to coherent waveform since it will finish the data transfer in a short period and thus save the power typically used for converging the FTL/TTL loops to obtain a coherent channel.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 and a decoding component 224. The communication component 222 and/or the modem 220 of the UE 110 may be configured to communicate with the BS 105 via a cellular network, a Wi-Fi network, or other wireless and wired networks. The decoding component 224 may decode data received by the UE 110, and/or decode data transmitted over coherent and/or non-coherent channels. In some implementations, the BS 105 may include a communication component 322 configured to communicate with the UE 110 and/or transmit data over coherent and/or non-coherent channels.

A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
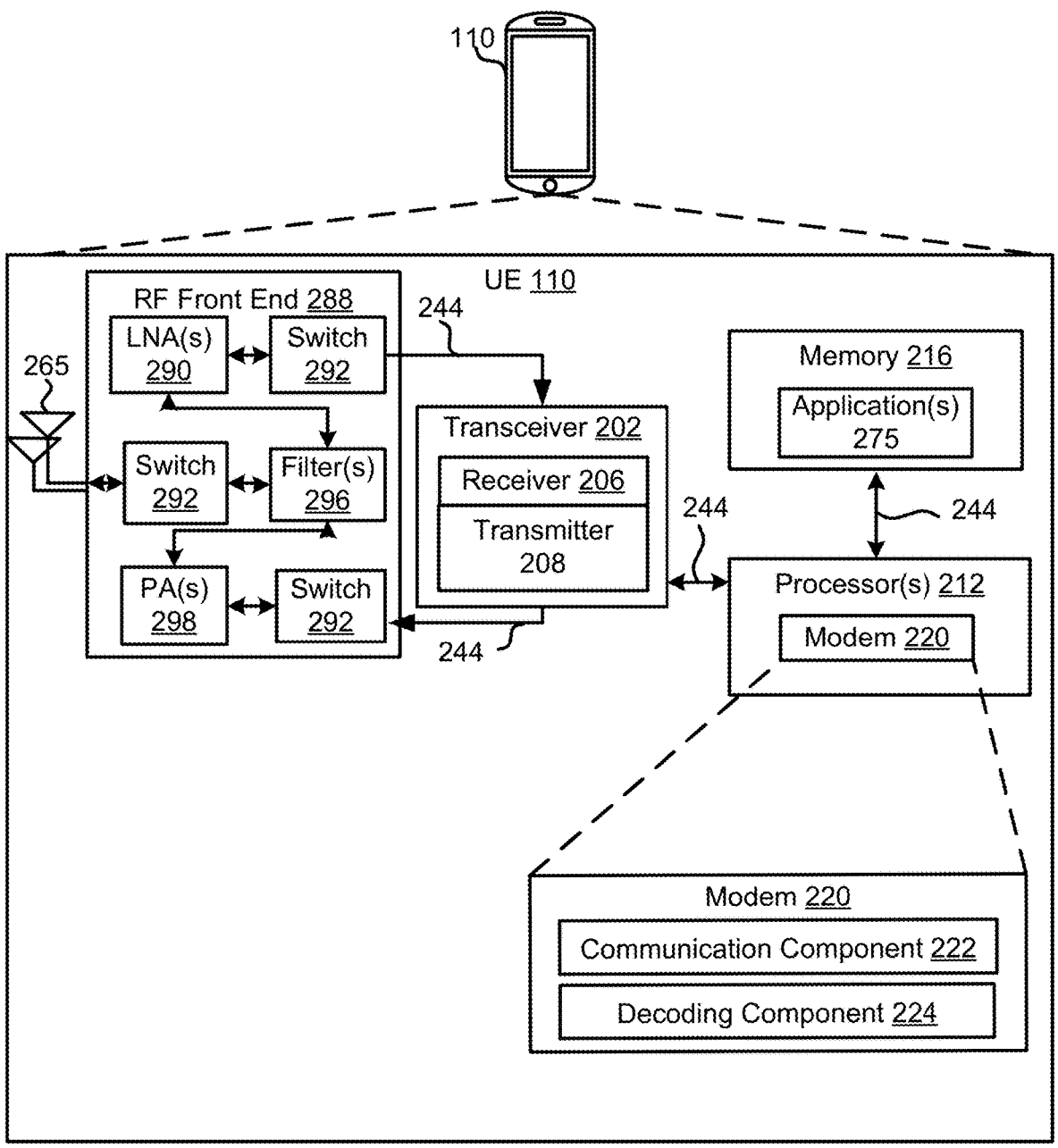
FIG. 2 is a schematic diagram of an example of a user equipment.

Referring to FIG. 2, one example of an implementation of the UE 110 may include a modem 220 having a communication component 222 and a decoding component 224. The communication component 222 and/or the modem 220 of the UE 110 may be configured to communicate with the BS 105 via a cellular network, a Wi-Fi network, or other wireless and wired networks. The decoding component 224 may decode data received by the UE 110. The decoding component 224 may be configured to decode coherent and/or non-coherent transmissions.

In some implementations, the UE 110 may include a variety of components, including components such as one or more processors 212 and memory 216 and transceiver 202 in communication via one or more buses 244, which may operate in conjunction with the modem 220, the communication component 222 and the decoding component 224 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and the decoding component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the decoding component 224 and the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222 and the decoding component 224 and/or one or more of their subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
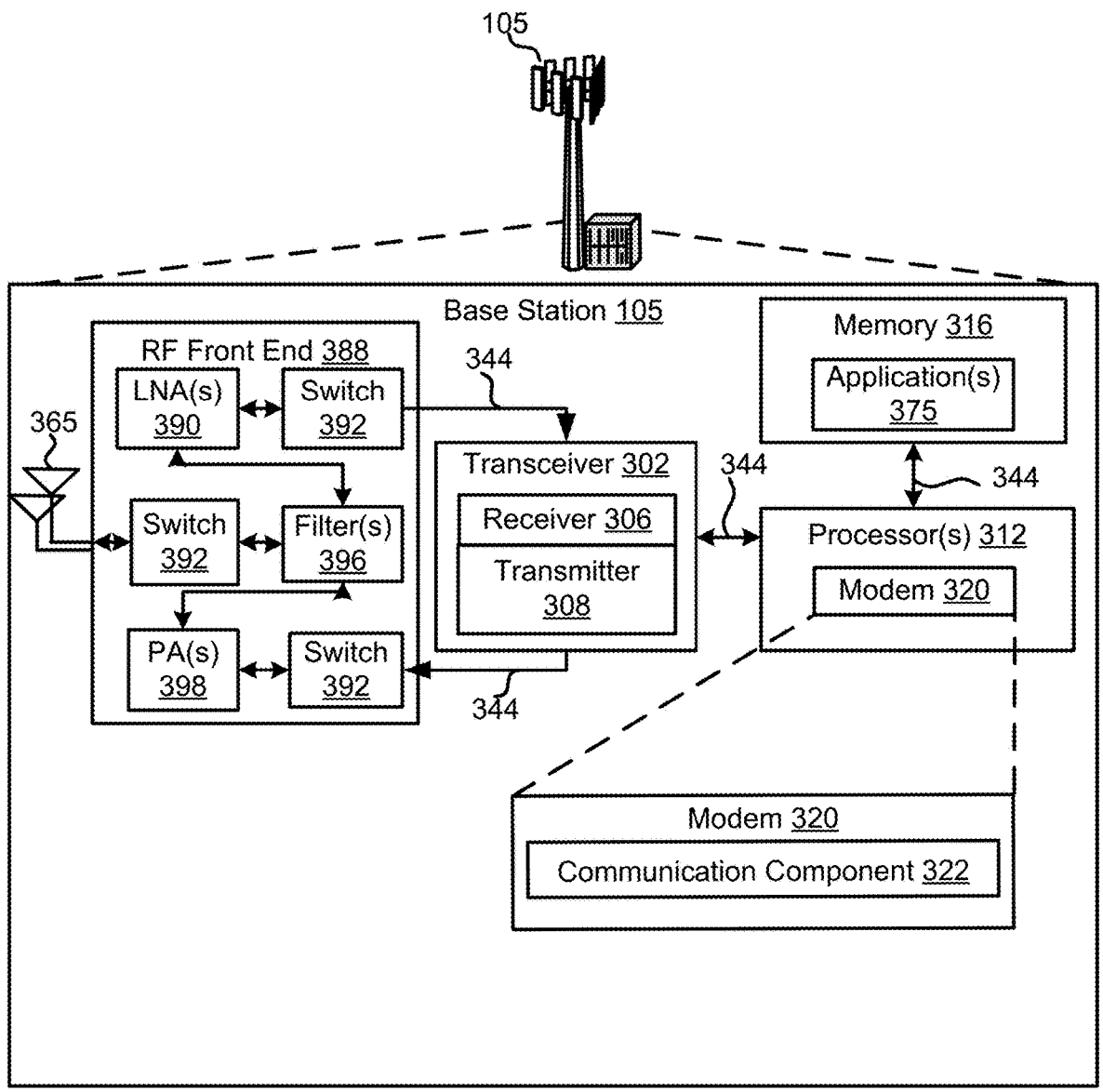
FIG. 3 is a schematic diagram of an example of a base station.

Referring to FIG. 3, one example of an implementation of the BS 105 may include a modem 320 with a communication component 322 configured to transmit data over coherent and/or non-coherent channels. The communication component 322 and/or the modem 320 the BS 105 may be configured to communicate with the UE 110 via a cellular network, a Wi-Fi network, or other wireless and wired networks.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of its subcomponents, and/or data associated therewith, when the BS 105 is operating at least one processor 312 to execute the communication component 322 and/or one or more of the subcomponents.

Transceiver 302 may include at least one receiving device 306 and at least one transmitter 308. The at least one receiving device 306 may include hardware, firmware, and/or software code executable by a processor for receiving data, the code comprising instructions and being stored in a memory (e.g., computer-readable medium). Receiving device 306 may be, for example, a RF receiving device. In an aspect, receiving device 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
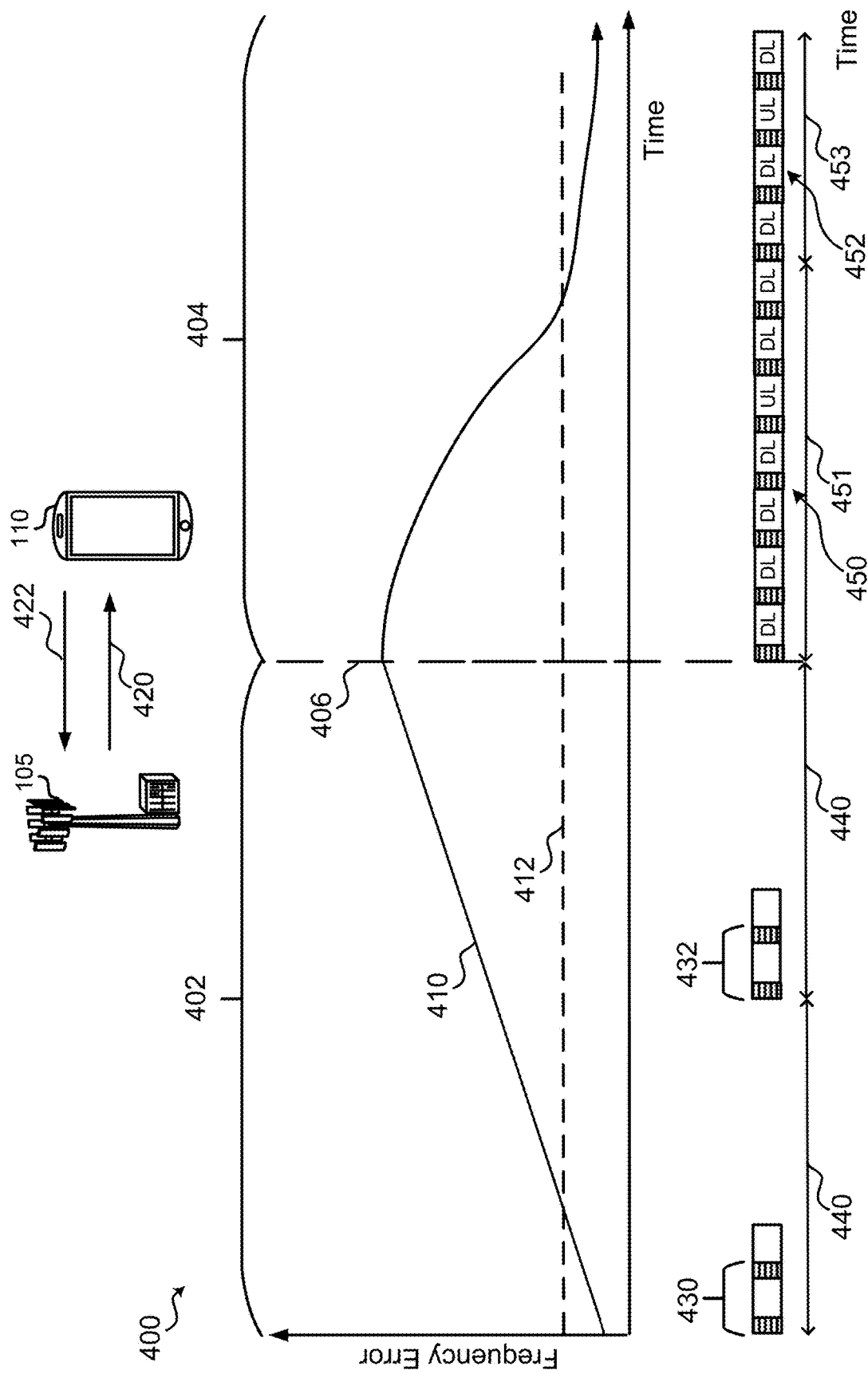
FIG. 4 is schematic diagram of an example of decoding non-coherent downlink data, including a graph of frequency error over time in communications during a discontinuous reception phase and an active communication phase of a connected mode discontinuous reception cycle, and a corresponding timeline of transmissions.

Referring now to FIG. 4, in an example of non-coherent downlink data communication 400, the UE 110 may be in a DRX phase 402 of a connected mode discontinuous reception (CDRX) cycle. During the DRX phase 402, the UE 110 may not be actively communicating with the BS 105. Instead, the UE 110 may periodically monitor one or more downlink channels/waveforms 420 for downlink data during certain "on" durations. The UE 110 may use less electrical energy when operating in the DRX phase 402 than an active communication phase. Upon receiving non-coherent downlink data, the UE 110 may begin exchanging non-coherent data (uplink and downlink) with the BS 105 via the one or more downlink channels/waveforms 420 and/or one or more uplink channel/waveforms 422. Subsequently, the UE 110 may transition to an active communication phase 404, e.g., based on receiving control signaling and/or data signaling during an "on" period of the DRX phase 402 that indicates resources for scheduled data transmissions. During the active communication phase 404, the UE 110 may exchange non-coherent data with the BS 105 until the one or more downlink channels/waveforms 420 and/or one or more uplink channel/waveforms 422 transition from non-coherent channels to coherent channels. After the one or more downlink channels/waveforms 420 and/or one or more uplink channel/waveforms 422 transition from non-coherent channels to coherent channels, the UE 110 may exchange coherent data with the BS 105.

In some aspects of the present disclosure, the UE 110 may operate in the DRX phase 402, during which a frequency error 410 of the one or more downlink channels/waveforms 420 (e.g., mismatch in beamforming characteristics of the one or more antennas 365 of the BS 105 and the one or more antennas 265 of the UE 110) between the BS 105 and the UE 110 may increase with time. The frequency error 410 may increase above a threshold 412. In other words, when the frequency error 410 is below the threshold 412, the one or more downlink/uplink channels/waveforms 420/422 may be one or more coherent channels. In contrast, when the frequency error 410 is above the threshold 412, the one or more downlink/uplink channels/waveforms 420/422 may be one or more non-coherent channels. The threshold 412 may be a value predetermined by the BS 105.

In some aspects, the frequency error 410 may be increased due to changes (e.g., operating frequency, electrical power, electrical interference) in the electronics/devices in the UE 110 and/or BS 105, interference (e.g., atmospheric, obstructions), or other factors. Alternatively or in addition, for example, the frequency error 410 may be increased due to a lack of channel estimation, channel correction, antenna calibration, and/or reference signals transmission/reception during the DRX phase 402.

In an aspect of the present disclosure, the UE 110 may periodically monitor the one or more downlink channels/waveforms 420 during the DRX phase 402 during one or more periodic "on" durations every DRX cycle 440. The DRX cycle 440 may be 1 millisecond (ms), 2 ms, 5 ms, 10 ms, 20 ms, 50 ms, 100 ms, 200 ms, 500 ms, 1 second (s) or other durations. The DRX cycle 440 may depend on the applications executed by the UE 110, available resources allocated by the BS 105, battery mode of the UE 110, battery life of the UE 110, or other factors. For example, the UE 110 may monitor the one or more downlink channels/waveforms 420 during a first on-duration 430. During the first on-duration 430, the UE 110 may activate the one or more antennas 265 of the UE 110 and/or the modem 220 to "listen" for downlink control signaling and/or data transmitted by the BS 105. At the end of the first on-duration 430, the UE 110 may deactivate the one or more antennas 265 and/or the modem 220 to conserve electrical energy when the UE 110 does not detect any downlink data. The hatching portion of the first on-duration 430 may indicate an example of control signaling, guard band, and/or cyclic prefixes.

Further, for example, the UE 110 may monitor the one or more downlink channels/waveforms 420 during a second on-duration 432, e.g., at an amount of time from the first on-duration 430 based on a configured periodicity. During the second on-duration 432, the UE 110 may activate the one or more antennas 265 of the UE 110 and/or the modem 220 to "listen" for downlink control signaling and/or data transmitted by the BS 105. At the end of the second on-duration 432, the UE 110 may deactivate the one or more antennas 265 and/or the modem 220 to conserve electrical energy when the UE 110 does not detect any downlink data. The hatching portion of the second on-duration 432 may indicate an example of control signaling, guard band, and/or cyclic prefixes.

In some instances, the BS 105 may transmit downlink control or data to the UE 110, and such data may arrive at the UE 110 at or after a time 406. When the UE 110 detects the downlink control or data or based on received control signaling indicating scheduled data transmissions, the UE 110 may transition into the active communication phase 404 of the CDRX cycle. The UE 110 may receive downlink data (e.g., boxed labeled "DL" in the figure) and/or transmit uplink data (e.g., boxes labeled "UL" in the figure) as non-coherent data 450 during a non-coherent communication state 451 because the one or more downlink channels/waveforms 420 and/or one or more uplink channel/waveforms 422 are non-coherent channels in the non-coherent communication state 451. Due to the non-coherent connections between the UE 110 and the BS 105, the UE 110 may decode the received downlink data of the non-coherent data 450 without some or all of channel state information. The BS 105 may decode the transmitted uplink data of the non-coherent data 450 without some or all of channel state information. The channel state information may be used to perform channel estimation. The BS 105 may indicate the transmission and/or reception of the non-coherent data 450 to and/or from the UE 110 in the radio resource control (RRC) configuration, the downlink control information (DCI), or other data structures. The hatched portion of the non-coherent data 450 may indicate an example of control signaling, guard band, and/or cyclic prefixes.

In some implementations, the UE 110 and/or the BS 105 may begin to perform a channel estimation process after the time 406. The channel estimation process may include the BS 105 sending reference signals and the UE 110 estimating the quality of the channel based any changes to the amplitude (i.e., attenuation), phase (i.e., phase-shift), frequency (i.e., frequency-shift), and/or added noise to the reference signals. The quality of the channel may be the channel state information. The channel estimation process may include modifying the beams of the one or more antennas 265 of the UE 110 and/or the beams of the one or more antennas 365 of the BS 105 to compensate for the quality of the channel.

In certain implementations, the channel estimation process may decrease the frequency error 410 below the threshold 412. After the frequency error 410 decreases below the threshold 412, the communication state may transition to a coherent communication state 453 and the UE 110 may receive downlink data (e.g., boxes labeled "DL" in the figure) and/or transmit uplink data (e.g., boxes labeled "UL" in the figure) as coherent data 452 because the one or more downlink channels/waveforms 420 and/or one or more uplink channel/waveforms 422 are coherent channels after the channel estimation process. The hatched portion of the coherent data 452 may indicate an example of control signaling, guard band, and/or cyclic prefixes.

In an instance, the UE 110 may decode the DL data transmitted by the BS 105 before the one or more downlink channels/waveforms 420 and/or one or more uplink channel/waveforms 422 become coherent channels in the coherent communication state 453. In such cases, the UE 110 and/or the BS 105 may suspend or terminate the channel estimation process. Further, the UE 110 may transition from the active communication phase 404 back to the DRX phase 402. As such, the early transition of the UE 110 to the DRX phase 402 may conserve additional electrical energy.

Figure 5A:
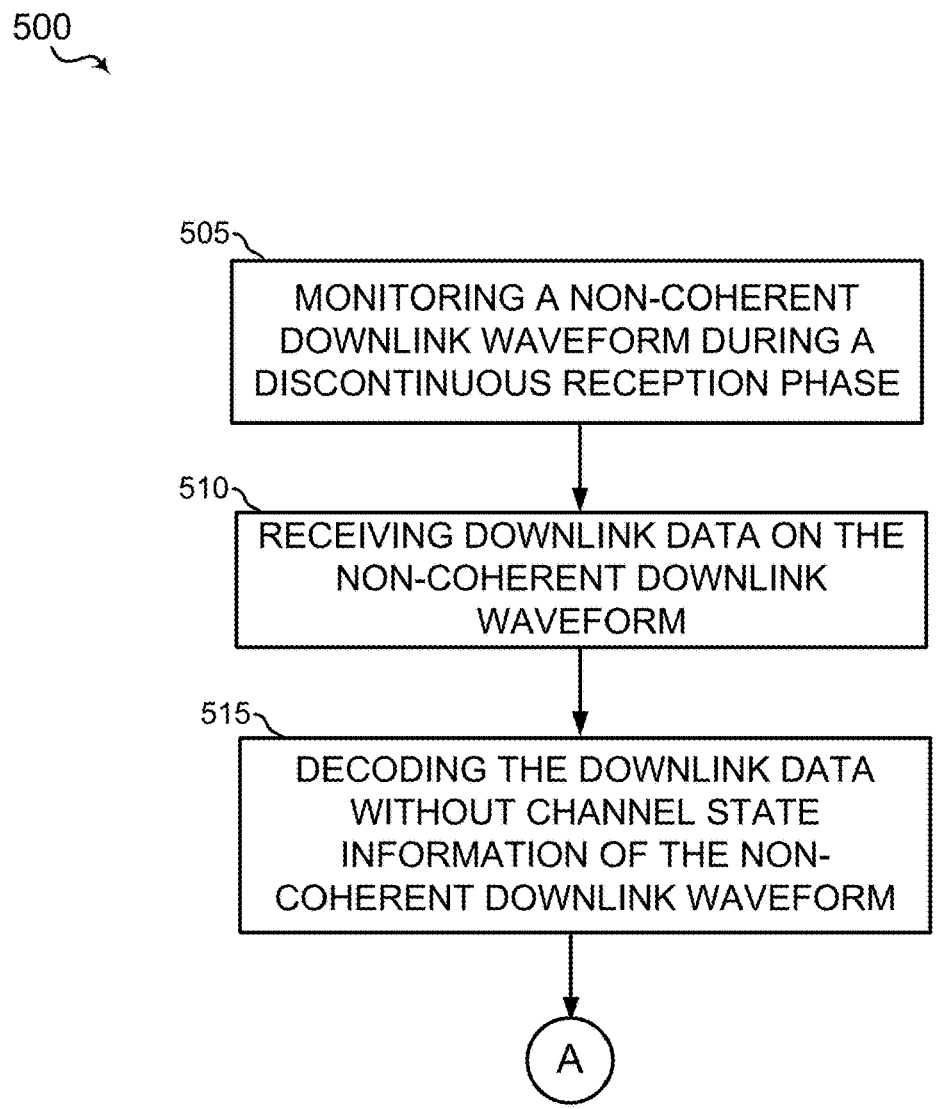
FIG. 5A is a process flow diagram of an example of a method of decoding non-coherent downlink data

Referring to FIG. 5A, an example of a method 500 for receiving non-coherent data may be performed by the UE 110 in the wireless communication network 100.

At block 505, the method 500 may monitor a non-coherent downlink waveform during a discontinuous reception phase. For example, the communication component 222, the modem 220, and/or the processor 212 of the UE 110 may monitor the one or more downlink channels/waveforms 420 during the DRX phase 402, such as described above with regard to FIG. 4.

In certain implementations, the processor 212, the modem 220, the communication component 222, the transceiver 202, the receiver 206, the transmitter 208, the RF front end 288, and/or the subcomponents of the RF front end 288 may be configured to and/or may define means for monitoring a non-coherent downlink waveform during a discontinuous reception phase.

At block 510, the method 500 may receive first data on the non-coherent downlink waveform. For example, the communication component 222, the modem 220, and/or the processor 212 of the UE 110 may receive the DL data on the one or more downlink channels/waveforms 420 during the active communication phase 404, such as described above with regard to FIG. 4. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the DL data, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving first data on the non-coherent downlink waveform.

At block 515, the method 500 may decode the downlink data without channel state information of the non-coherent downlink waveform. For example, the decoding component 224, the modem 220, and/or the processor 212 of the UE 110 may decode the downlink data without channel state information of the one or more downlink channels/waveforms 420, such as described above with regard to FIG. 4.

In certain implementations, the processor 212, the modem 220, and/or the decoding component 224 may be configured to and/or may define means for decoding the downlink data without channel state information of the non-coherent downlink waveform.

Figure 5B:
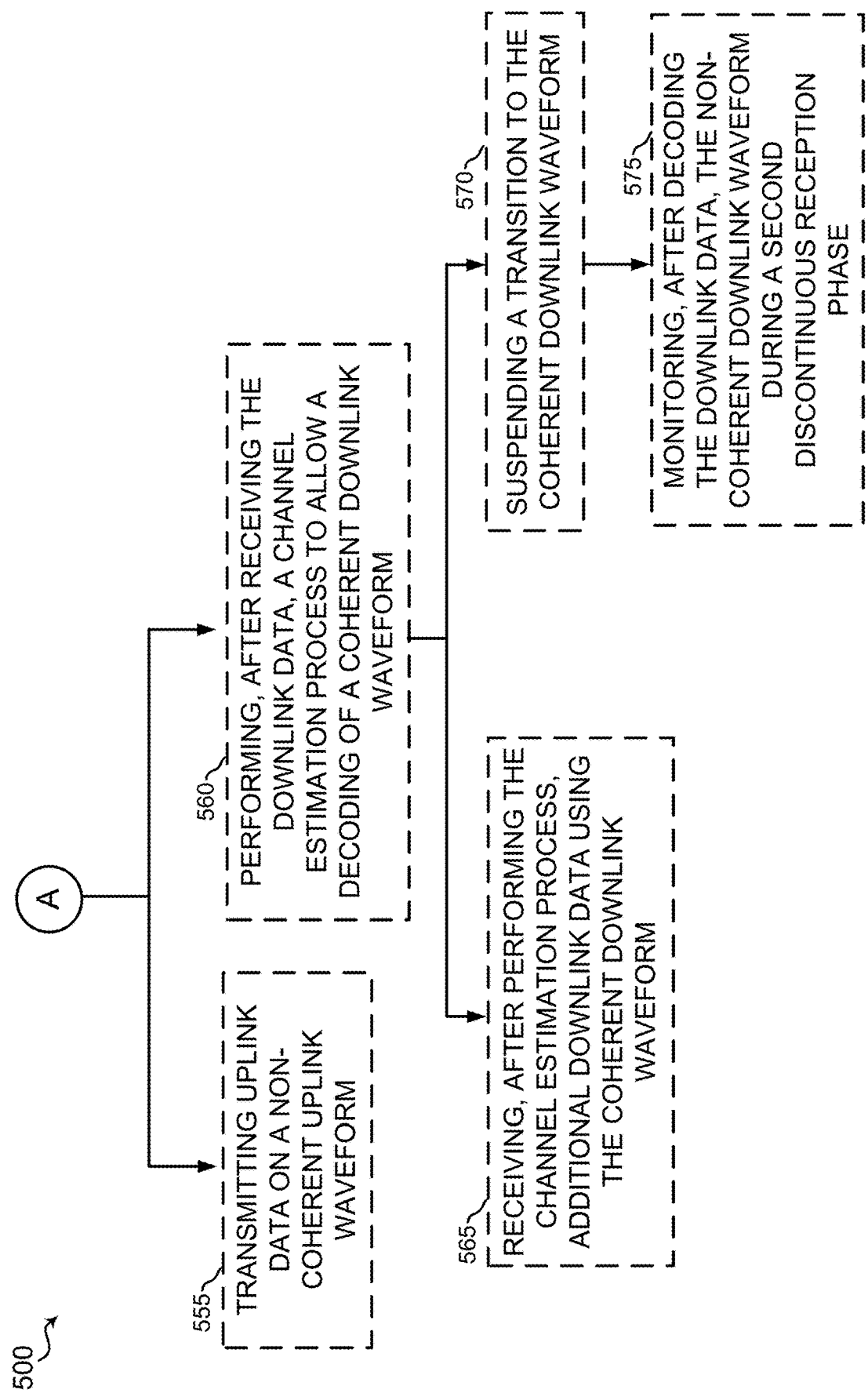
FIG. 5B is a process flow diagram of the example of the method of decoding the non-coherent downlink data after the DRX phase.

Turning now to FIG. 5B, the method 500 of receiving non-coherent data after the DRX phase 402 may be performed by the UE 110.

Alternatively or additionally, at block 555, the method 500 may further include transmitting uplink data on a non-coherent uplink channel. For example, the communication component 222, the modem 220, and/or the processor 212 of the UE 110 may transmit the UL data on the one or more uplink channels/waveforms 422 during the active communication phase 404, such as described above with regard to FIG. 4. The communication component 222 may send the UL data to the transceiver 202 or the transmitter 208. The transceiver 202 or the transmitter 208 may convert the UL data to electrical signals and send to the RF front end 288. The RF front end 288 may filter and/or amplify the electrical signals. The RF front end 288 may send the electrical signals as electro-magnetic signals via the one or more antennas 265.

Alternatively or additionally, the method 500 may further include any of the methods above, wherein the uplink channel is a physical uplink control channel, a physical uplink shared channel, or a physical random access channel.

Alternatively or additionally, at block 560, the method 500 may further include performing, after receiving the downlink data, a channel estimation process to convert the non-coherent downlink channel to a coherent downlink channel. For example, the communication component 222, the modem 220, and/or the processor 212 of the UE 110 may perform the channel estimation by receiving reference signals and transmitting responses to the BS 105 as described above.

Alternatively or additionally, at block 565, the method 500 may further include receiving, after performing the channel estimation process, additional downlink data on the coherent downlink channel. For example, the communication component 222, the modem 220, and/or the processor 212 of the UE 110 may receive additional downlink data as described above.

Alternatively or additionally, at block 570, the method 500 may further include suspending the channel estimation process before completion and monitoring, after decoding the downlink data, the non-coherent downlink channel during a second discontinuous reception phase.

Alternatively or additionally, at block 575, the method 500 may further include monitoring, after decoding the downlink data, the non-coherent downlink waveform during a second discontinuous reception phase. For example, the communication component 222, the modem 220, and/or the processor 212 of the UE 110 may monitor the non-coherent downlink waveform during a second discontinuous reception phase.

Alternatively or additionally, the method 500 may further include any of the methods above, wherein the downlink waveform is transmitted in a physical downlink control channel, a physical downlink shared channel, a physical broadcast channel, or a physical random access channel.

Figure 6:
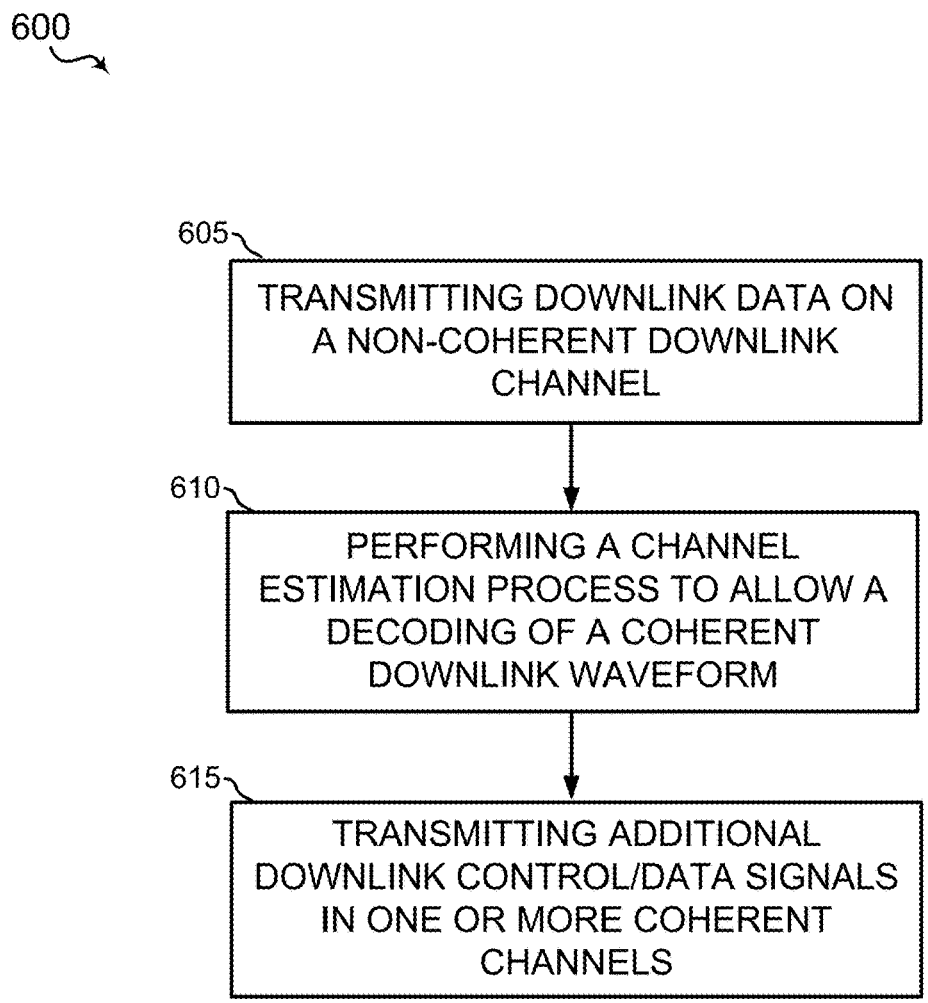
FIG. 6 is a process flow diagram of an example of a method of transmitting data over a non-coherent channel.

Referring to FIG. 6, a method 600 of transmitting control/data signals in one or more non-coherent channels may be performed by the BS 105.

At block 605, the method 600 may transmit downlink data on a non-coherent downlink channel. For example, the communication component 322 of the BS 105 may transmit the non-coherent data 450 to the UE 110.

At block 610, the method 600 may perform a channel estimation process to allow a decoding of a coherent downlink waveform. For example, the communication component 322 may perform a channel estimation process by transmitting reference signals and receiving channel feedback based on the reference signals.

At block 615, the method 600 may transmit additional downlink control/data signals in one or more coherent channels. For example, the communication component 322 may transmit the coherent data 452 to the UE 110.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting downlink data on a non-coherent downlink channel.

Additional Implementations

In an aspect, a method includes monitoring a non-coherent downlink waveform during a discontinuous reception phase, receiving downlink data on the non-coherent downlink waveform, and decoding the downlink data without channel state information of the non-coherent downlink waveform.

Any of the methods above, further comprising transmitting uplink data on a non-coherent uplink waveform.

Any of the methods above, wherein the uplink waveform is transmitted in a physical uplink control channel, a physical uplink shared channel, or a physical random access channel.

Any of the methods above, further comprising performing, after receiving the downlink data, a channel estimation process to allow a decoding of a coherent downlink waveform.

Any of the methods above, further comprising receiving, after performing the channel estimation process, additional downlink data using the coherent downlink waveform.

Any of the methods above, further comprising suspending completion transition to the coherent downlink waveform and monitoring, after decoding the downlink data, the non-coherent downlink waveform during a second discontinuous reception phase.

Any of the methods above, wherein the downlink waveform is transmitted in a physical downlink control channel, a physical downlink shared channel, a physical broadcast channel, or a physical random access channel.

Any of the methods above, further comprising monitoring, after decoding the downlink data, the non-coherent downlink waveform during a second discontinuous reception phase.

A user equipment comprising a memory, a transceiver, and one or more processors operatively coupled with the memory and the transceiver, the one or more processors configured to execute instructions in the memory to monitor a non-coherent downlink waveform during a discontinuous reception phase, receive, via the transceiver, downlink data on the non-coherent downlink waveform, and decode the downlink data without channel state information of the non-coherent downlink waveform.

Any of the UE above, wherein the one or more processors are further configured to execute the instructions to transmit uplink data on a non-coherent uplink waveform.

Any of the UE above, wherein the uplink waveform is transmitted in a physical uplink control channel, a physical uplink shared channel, or a physical random access channel.

Any of the UE above, wherein the one or more processors are further configured to execute the instructions to perform, after receiving the downlink data, a channel estimation process to allow a decoding of a coherent downlink waveform.

Any of the UE above, wherein the one or more processors are further configured to execute the instructions to receive, after performing the channel estimation process, additional downlink data using the coherent waveform.

Any of the UE above, wherein the one or more processors are further configured to execute the instructions to suspend a transition to the downlink coherent waveform and monitor, after decoding the downlink data, the non-coherent downlink waveform during a second discontinuous reception phase.

Any of the UE above, wherein the downlink waveform is transmitted in a physical downlink control channel, a physical downlink shared channel, a physical broadcast channel, or a physical random access channel.

A non-transitory computer readable medium having instructions stored therein that, when executed by one or more processors of a user equipment (UE), cause the one or more processors to monitor a non-coherent downlink waveform during a discontinuous reception phase, receive downlink data on the non-coherent downlink waveform, and decode the downlink data without channel state information of the non-coherent downlink waveform.

Any of the transitory computer readable medium above, further comprising instructions that, when executed by the one or more processors, cause the one or more processors to transmit uplink data on a non-coherent uplink waveform.

Any of the transitory computer readable medium above, wherein the uplink waveform is transmitted in a physical uplink control channel, a physical uplink shared channel, or a physical random access channel.

Any of the transitory computer readable medium above, further comprising instructions that, when executed by the one or more processors, cause the one or more processors to perform, after receiving the downlink data, a channel estimation process to allow decoding of a coherent downlink waveform.

Any of the transitory computer readable medium above, further comprises instructions that, when executed by the one or more processors, cause the one or more processors to receive, after performing the channel estimation process, additional downlink data using the coherent waveform.

Any of the transitory computer readable medium above, further comprises instructions that, when executed by the one or more processors, cause the one or more processors to suspend a transition to coherent waveform and monitor, after decoding the downlink data, the non-coherent downlink waveform during a second discontinuous reception phase.

Any of the transitory computer readable medium above, wherein the downlink waveform is transmitted in a physical downlink control channel, a physical downlink shared channel, a physical broadcast channel, or a physical random access channel.

A user equipment, comprising means for monitoring a non-coherent downlink waveform during a discontinuous reception phase, means for receiving downlink data on the non-coherent downlink waveform, and means for decoding the downlink data without channel state information of the non-coherent downlink waveform.

Any of the UE above, further comprising means for transmitting uplink data on a non-coherent uplink waveform.

Any of the UE above, wherein the uplink waveform is transmitted in a physical uplink control channel, a physical uplink shared channel, or a physical random access channel.

Any of the UE above, further comprising performing, after receiving the downlink data, a channel estimation process to allow a decoding of a coherent downlink waveform.

Any of the UE above, further comprising means for receiving, after performing the channel estimation process, additional downlink data using the coherent downlink waveform.

Any of the UE above, further comprising means for suspending a transition to the coherent downlink waveform and means for monitoring, after decoding the downlink data, the non-coherent downlink waveform during a second discontinuous reception phase.

Any of the UE above, wherein the downlink waveform is transmitted in a physical downlink control channel, a physical downlink shared channel, a physical broadcast channel, or a physical random access channel.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
    monitoring a non-coherent downlink channel during a discontinuous reception phase;
    receiving downlink data on the non-coherent downlink channel;
    decoding the downlink data without channel state information of the non-coherent downlink channel; and
    transmitting uplink data on a non-coherent uplink channel.

2. The method of claim 1, wherein the non-coherent uplink channel is a physical uplink control channel, a physical uplink shared channel, or a physical random access channel.

3. The method of claim 1, further comprising performing, after receiving the downlink data, a channel estimation process to allow a decoding of a coherent downlink channel.

4. The method of claim 3, further comprising receiving, after performing the channel estimation process, additional downlink data using the coherent downlink channel.

5. The method of claim 3, further comprising:
suspending a transition to the coherent downlink channel; and
monitoring, after decoding the downlink data, the non-coherent downlink channel during a second discontinuous reception phase.

6. The method of claim 1, wherein the downlink channel is a physical downlink control channel, a physical downlink shared channel, a physical broadcast channel, or a physical random access channel.

7. A user equipment (UE), comprising:
a memory;
a transceiver; and
one or more processors operatively coupled with the memory and the transceiver, the one or more processors configured to execute instructions in the memory to:
monitor a non-coherent downlink channel during a discontinuous reception phase;
receive, via the transceiver, downlink data on the non-coherent downlink channel;
decode the downlink data without channel state information of the non-coherent downlink channel; and
transmit uplink data on a non-coherent uplink channel.

8. The UE of claim 7, wherein the uplink channel is a physical uplink control channel, a physical uplink shared channel, or a physical random access channel.

9. The UE of claim 7, wherein the one or more processors are further configured to execute the instructions to perform, after receiving the downlink data, a channel estimation process to allow a decoding of a coherent downlink channel.

10. The UE of claim 9, wherein the one or more processors are further configured to execute the instructions to receive, after performing the channel estimation process, additional downlink data using the coherent downlink channel.

11. The UE of claim 9, wherein the one or more processors are further configured to execute the instructions to:
suspend a transition to the coherent downlink channel, and
monitor, after decoding the downlink data, the non-coherent downlink channel during a second discontinuous reception phase.

12. The UE of claim 7, wherein the non-coherent downlink channel is a physical downlink control channel, a physical downlink shared channel, a physical broadcast channel, or a physical random access channel.

13. A non-transitory computer readable medium having instructions stored therein that, when executed by one or more processors of a user equipment (UE), cause the one or more processors to:
monitor a non-coherent downlink channel during a discontinuous reception phase;
receive downlink data on the non-coherent downlink channel;
decode the downlink data without channel state information of the non-coherent downlink channel; and
transmit uplink data on a non-coherent uplink channel.

14. The non-transitory computer readable medium of claim 13, wherein the non-coherent uplink channel is a physical uplink control channel, a physical uplink shared channel, or a physical random access channel.

15. The non-transitory computer readable medium of claim 13, further comprising instructions that, when executed by the one or more processors, cause the one or more processors to perform, after receiving the downlink data, a channel estimation process to allow decoding of a coherent downlink channel.

16. The non-transitory computer readable medium of claim 15, further comprises instructions that, when executed by the one or more processors, cause the one or more processors to receive, after performing the channel estimation process, additional downlink data using the coherent downlink channel.

17. The non-transitory computer readable medium of claim 15, further comprises instructions that, when executed by the one or more processors, cause the one or more processors to:
suspend a transition to the coherent downlink channel, and
monitor, after decoding the downlink data, the non-coherent downlink channel during a second discontinuous reception phase.

18. The non-transitory computer readable medium of claim 13, wherein the non-coherent downlink channel is a physical downlink control channel, a physical downlink shared channel, a physical broadcast channel, or a physical random access channel.

19. A user equipment (UE), comprising:
means for monitoring a non-coherent downlink channel during a discontinuous reception phase;
means for receiving downlink data on the non-coherent downlink channel;
means for decoding the downlink data without channel state information of the non-coherent downlink channel; and
means for transmitting uplink data on a non-coherent uplink channel.

20. The UE of claim 19, wherein the uplink channel is a physical uplink control channel, a physical uplink shared channel, or a physical random access channel.

21. The UE of claim 19, further comprising performing, after receiving the downlink data, a channel estimation process to allow a decoding of a coherent downlink channel.

22. The UE of claim 21, further comprising means for receiving, after performing the channel estimation process, additional downlink data using the coherent downlink channel.

23. The UE of claim 21, further comprising:
means for suspending a transition to the coherent downlink channel, and
means for monitoring, after decoding the downlink data, the non-coherent downlink channel during a second discontinuous reception phase.

24. The UE of claim 19, wherein the downlink channel is a physical downlink control channel, a physical downlink shared channel, a physical broadcast channel, or a physical random access channel.

25. The method of claim 1, wherein the non-coherent downlink channel has frequency error above a threshold error.

* * * * *